United States Patent [19]
Leshem

[11] Patent Number: 5,577,004
[45] Date of Patent: Nov. 19, 1996

[54] MEMORY SYSTEM AND METHOD

[75] Inventor: Eli Leshem, Brookline, Mass.

[73] Assignee: EMC Corporation, Hopkinton, Mass.

[21] Appl. No.: 566,066

[22] Filed: Dec. 1, 1995

[51] Int. Cl.⁶ .............. G11C 7/00; G11C 8/00; G11C 29/00
[52] U.S. Cl. .............. 365/230.03; 365/230.06; 365/200; 371/40.1; 371/40.4
[58] Field of Search .............. 365/230.03, 230.06, 365/200, 193, 201; 371/40.1, 40.4, 47.1

[56]    References Cited
       U.S. PATENT DOCUMENTS

| | | | |
|---|---|---|---|
| 4,797,850 | 1/1989 | Amitai | 365/193 |
| 5,313,425 | 5/1994 | Lee et al. | 365/201 |
| 5,379,415 | 1/1995 | Papenberg et al. | 371/47.1 |

Primary Examiner—David C. Nelms
Assistant Examiner—Trong Phan
Attorney, Agent, or Firm—Fish & Richardson, P.C.

[57] ABSTRACT

A memory system wherein a plurality of memory banks is provided, each having a plurality of addressable memory units. A driver is coupled to a set of address terminals of a corresponding one of the memory units in each one of the memory banks. Each bit of data is fed to a data terminal of a corresponding one of the memory units in each one of the memory banks. An error detection and correction (EDAC) unit is fed by the data passing to, or from, the memory system. With such an arrangement, a failure of any one of the drivers results in an error in only one bit of the data stored in the incorrectly addressed location, and such single bit error is corrected by the EDAC unit upon its retrieval from the memory system.

9 Claims, 2 Drawing Sheets

MEMORY SYSTEM AND METHOD

BACKGROUND OF THE INVENTION

This invention relates generally to memory systems and more particularly to error detection and correction (EDAC) used in memory systems.

As is known in the art, in many applications a memory board is arranged as shown in FIG. 1. Thus, such memory board includes a plurality of memory banks $10_1-10_n$. Each one of the memory banks $10_1-10_n$ has a plurality of random access memories (RAMs), here for example, dynamic RAMs (DRAMs) $12_0-12_m$. Each bit of a data word on a corresponding one of lines $D_0-D_m$ is coupled to the data bit terminal, D, of a corresponding one of the DRAMs $12_1-12_n$ in each one of the memory banks $10_1-10_n$. Thus, for example, data bit $D_0$ of the data word is coupled to the data bit terminal, D, of the DRAMs $12_0$ in each of the memory banks $10_1-10_n$. Each data word includes, in addition to data, a plurality of bits for error detection and correction. For example, a Solomon-Reed code. Thus, for example, if the data portion of the data word includes 64 bits (i.e., 8 bytes), an additional byte (i.e., 8 bits) is included in the data word for error correction and detection. Thus, in this example m=71 and there are 72 DRAMs $12_0-12_{71}$ in each one of the memory banks $10_1-10_n$.

Each DRAM is addressable by an r bit address, $A_0-A_{(r-1)}$. Consider, for example the case where r=12. Thus, a 12 bit row address and a 12 bit column address are fed sequentially to the address terminals, A, of the DRAMs. More particularly, when the 12 bit row address is fed to the DRAM, a control signal is also fed to a column address select line (CAS) of the DRAM. Likewise, when the 12 bit row address is fed to the DRAM, a control signal is fed to the row address select line (RAS) for the DRAM. The read/write mode of the DRAMs is selected by a control signal on write line (WR). Thus, here each DRAM has 16 megabits of addressable locations and, therefore, each memory bank is able to store 16 megs of 9 byte digital words; 8 bytes of data and a byte for error detection and correction.

It is noted that the address signals are fed to the memory board by a logic network, not shown. In order to provide adequate power to address large numbers of DRAMs, drivers 14 are included. Typically, each driver 14 is adapted to drive about 18–36 DRAMS. Thus, assuming here that each driver 14 is used to drive 36 DRAMs, there are 2 drivers 14 for each one of the memory banks $10_1-10_n$.

Finally, as mentioned above, the EDAC may be performed on the data by checking the data read from the memory using a Solomon-Reed code, for example. However, a failure in one of the drivers 14 results in the 36 bits of data being written to an incorrect memory location. While parity checking of the address may be used to detect the presence of an error in the address, an EDAC will not be able to readily correct 36 bits of data which have become stored in the incorrect address location.

SUMMARY OF THE INVENTION

In accordance with the present invention, a memory system is provided having a plurality of memory banks. Each one of the memory banks has a plurality of addressable memory units. A driver is coupled to a set of address terminals of a corresponding one of the memory units in each one of the memory banks. Each bit of data is fed to, or from, a data terminal of a corresponding one of the memory units in each one of the memory banks. An error detection and correction (EDAC) unit is fed by the data passing to, or from, the memory system.

With such an arrangement, a failure of any one of the drivers results in an error in only one bit of the data stored in the incorrectly addressed location, and such single bit error is readily correctable by the EDAC unit upon its retrieval from the memory system.

BRIEF DESCRIPTION OF THE DRAWING

For a more complete understanding of the invention, reference is now made to the following description taken together in conjunction with the accompanying drawing, in which.

DESCRIPTION OF THE PREFERRED EMBODIMENTS

Figure 1:
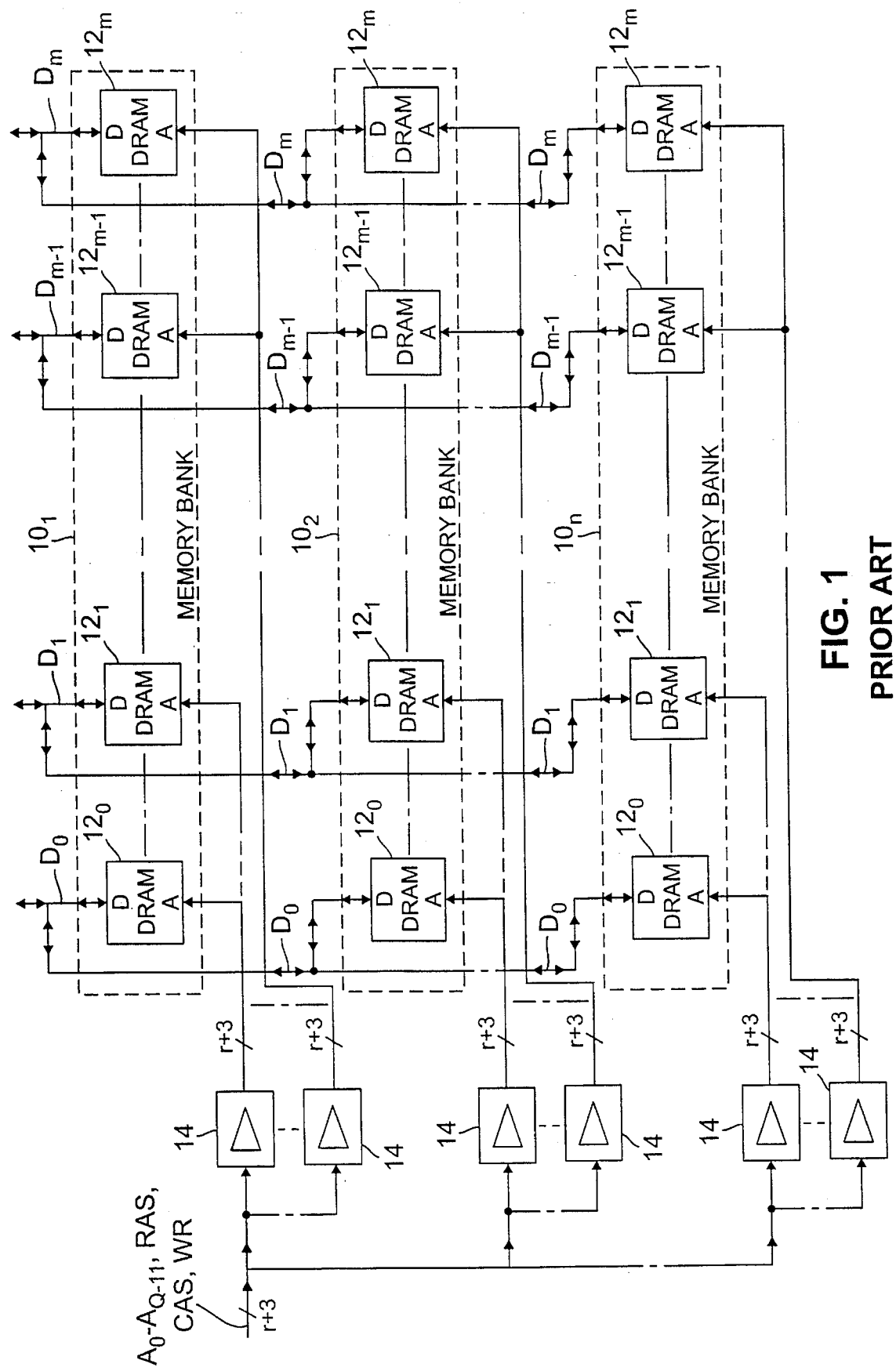
FIG. 1 is a block diagram of a memory system according to the prior art which has been discussed above.
Figure 2:
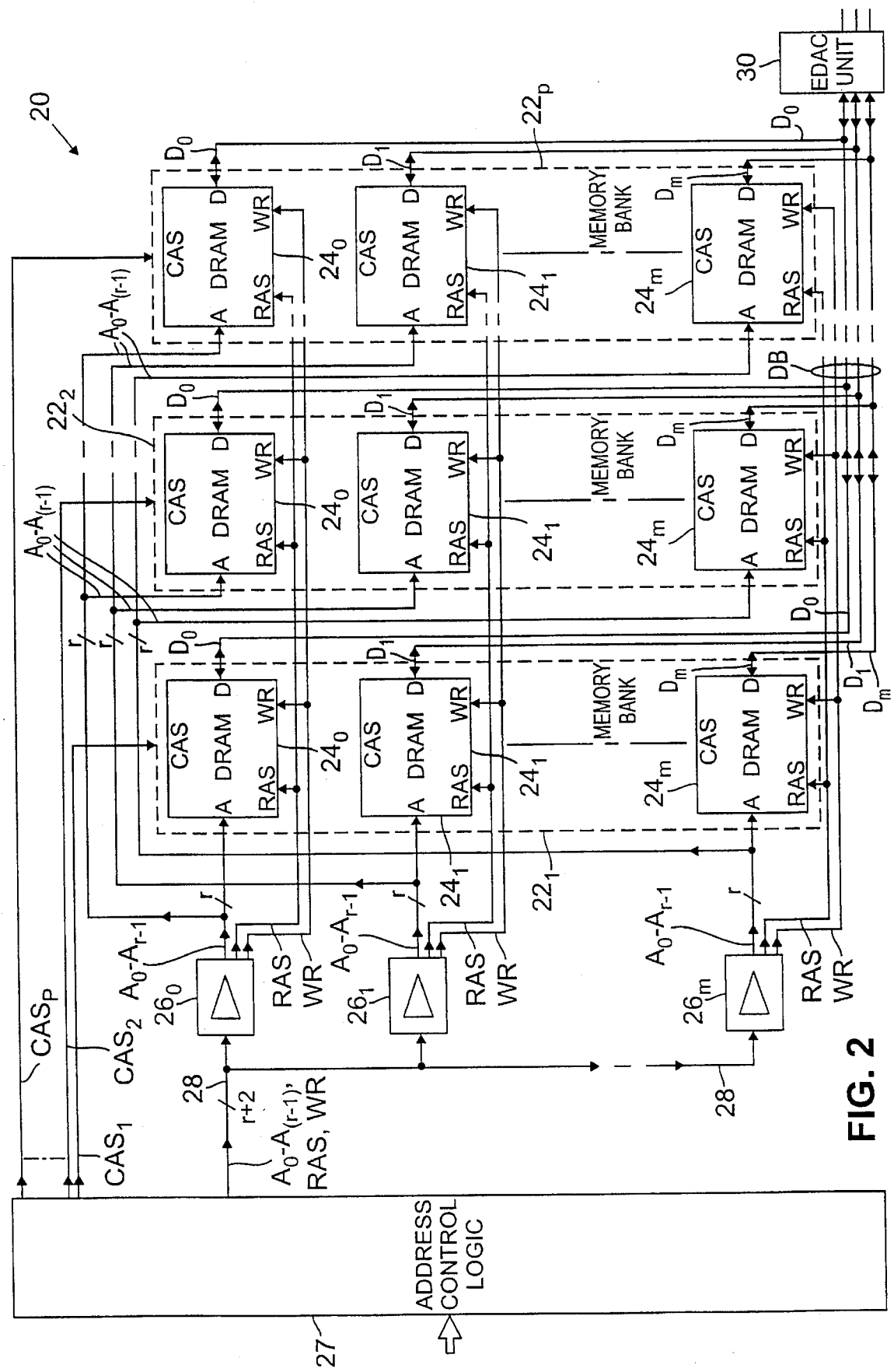
FIG. 2 is a block diagram of a memory system according to the invention.

Referring now to FIG. 2, a memory system 20 is shown having a plurality of, here p, memory banks $22_1-22_p$. Each one of the memory banks $22_1-22_p$ includes a plurality of, here m+1, memory units, here DRAMs $24_0-24_m$. Each one of the DRAMs $24_0-24_m$ has a set of address terminals, A, a data terminal, D, a column address select (CAS), a row address select (RAS) and a write enable (WR).

The memory 20 includes a plurality of, here m+1, drivers $26_01-26_m$. Each one of the drivers $26_0-26_m$ is coupled to the set of address terminals, A, of a corresponding one of the DRAMs $240-24_m$ in each one of the memory banks $22_1-22_p$. Thus, for example, driver $26_1$ is coupled to DRAMs $24_1$ in each one of the memory banks $22_1-22_p$. Likewise, for example, driver $26_m$ is coupled to DRAMs $24_m$ in each of the memory banks $22_1-22_p$.

Each one of the DRAMs $24_0-24_m$ in each of the memory banks $22_1-22_p$ include a data terminal, D. The data terminal, D, of one of the DRAMs $24_0-24_m$, in each one of the memory banks $22_1-22_p$ is coupled to a corresponding one bit line of an m+1 bit line data bus, DB. Thus, here the data bus DB has m+1 bit lines $D_m-D_0$, as shown. Therefore, the data terminal, D, of DRAMs $24_1$, for example, in each one of the memory banks $22_1-22_p$ is coupled to bit line $D_1$ of the data bus DB. Likewise, the data terminal, D, of DRAMs $24_m$, for example, in each one of the memory banks $22_1-22_p$ is coupled to bit line $D_m$ of the data bus DB.

An r bit address signal, $A_0-A_{r-1}$, from an address/control logic 27, is fed to drivers $26_0-26_m$ via an r+2 bit address bus 28, as shown. Each one of the drivers $26_0-26_m$ is coupled to the set of address terminals A of a corresponding one of the DRAMs $24_0-24_n$, respectively, in each of the memory banks $22_1-22_p$, as shown. Thus example, the r bit output of driver $26_1$ is coupled to the r bit set of address terminals, A, of DRAMs $24_1$ in each of the memory banks $22_1-22_p$, as shown. Likewise, the r bit output of driver $26_m$ is coupled to the r bit set of address terminal, A, of DRAMs $24_m$ in each of the memory banks $22_1-22_p$, as shown.

Also, address/control logic 27 produces a row memory access signal on line RAS and a write enable signal on line WR for each one of the drivers $26_0-26_m$, as shown. Each one of the drivers $26_0-26_m$ is coupled to the RAS and WR terminals of a corresponding one of the DRAMs $24_0-24_n$, respectively, in each one of the memory banks $22_1-22_p$, as shown. Thus, for example, the RAS line output of driver $26_0$ is coupled to the RAS terminals of DRAMs $24_0$ in each of the memory banks $22_1$–$22_p$, as shown, and the WR line output of driver $26_0$ is coupled to the WR terminals of DRAMs $24_0$ in each of the memory banks $22_1$–$22_p$, as shown.

A column memory access signal is produced by the address/control 27 on one of a plurality of, here p, lines $CAS_1$–$CAS_p$, for each produced column address. More particularly, each one of the lines $CAS_1$–$CAS_p$ is coupled to a corresponding one of the memory banks $22_1$–$22_p$, respectively, as shown. Thus, if an m+1 bit digital word is to be written into, or read from, the DRAMs $24_0$–$24_m$ in memory bank $22_2$, for example, when the r column bits of the address are produced by the drivers $26_0$–$26_m$, a column memory access signal is fed to line $CAS_2$. Likewise, if an m+1 bit digital word is to be written into, or read from, the DRAMs $24_0$–$24_m$ in memory bank $22_p$, for example, when the r column bits of the address are produced by the drivers $26_0$–$26_m$, a column memory access signal is fed to line $CAS_p$.

An error detection and correction (EDAC) unit 30 is included. The error detection and correction unit 30, is of any conventional design, such as a Solomon-Reed code EDAC. Further, the EDAC unit 30 need not be on the same board as the memory banks but rather may be mounted on a controller board, not shown, and coupled to the memory board through a backplane, not shown. In any event, the data bus DB (i.e, bit lines $D_0$–$D_m$) is coupled to EDAC 36, as shown. Therefore, a portion of the digital word on the data bus DB included data and the remaining portion included error detection and correction bits for the Solomon-Reed error detection and correction code. For example, if m=71, there will be 72 DRAMs $24_0$–$24_{71}$, and data bus DB will have 64 data bit lines $D_0$–$D_{63}$ and eight error detection bit lines $D_{64}$–$D_{71}$. With such arrangement, a failure of any one of the drivers $26_0$–$26_{71}$ results in an error in only one bit of the 72 bit data stored in a location incorrectly addressed because of the failed driver. This single bit of error in the data is corrected by the EDAC unit 30 upon its retrieval from the memory system 20.

Other embodiments are within the spirit and scope of the appended claims.

What is claimed is:

1. A memory system, comprising:

a plurality of memory banks, each having a plurality of addressable memory units;

a plurality of address drivers, each one of the drivers being coupled to a corresponding one of the memory units in each one of the memory banks; and, each bit of data being coupled to a data terminal of a corresponding one of the memory units in each one of the memory banks.

2. The memory system recited in claim 1 including an error detection and correction unit fed by the data passing to, or from, the memory system.

3. The memory system recited in claim 1 wherein each one of the memory banks is coupled to a different select line.

4. The memory system recited in claim 2 wherein each one of the memory banks is coupled to a different select line.

5. A memory system, comprising:

a plurality of memory banks, each one thereof having a plurality of memories, each one of such memories having a set of address terminals and a data terminal;

a plurality of drivers, each one being coupled to the set of address terminals of a corresponding one of the memories in each of the memory banks; and, a data bus having a plurality of bit lines, each one of the bit lines being coupled to a data terminal of a corresponding one of the memories in each of the memory banks.

6. The memory system recited in claim 5 including an error detection and correction unit coupled to the data bus.

7. The memory system recited in claim 6 wherein each one of the memory banks is coupled to a different select line.

8. The memory system recited in claim 5 wherein each one of the memories one of the memory banks is coupled to a corresponding one of a plurality of address select lines.

9. A method of operating a memory system, comprising:

providing: a plurality of memory banks, each having a plurality of addressable memory units; a plurality of address drivers, each one of the drivers being coupled to a corresponding one of the memory units in each one of the memory banks; and, each bit of data being coupled to a data terminal of a corresponding one of the memory units in each one of the memory banks; and, providing error detection and correction on the data passing to, or from, the memory system.

* * * * *

UNITED STATES PATENT AND TRADEMARK OFFICE
CERTIFICATE OF CORRECTION

PATENT NO. : 5,577,004

DATED : November 19, 1996

INVENTOR(S) : Eli Leshem

It is certified that error appears in the above-identified patent and that said Letters Patent is hereby corrected as shown below:

Col. 2, line 32, replace "$26_o1-26_m$" with --$26_o-26_m$--

Col. 2, line 34, replace "$240-24_m$" with --$24_o-24_m$--

Signed and Sealed this

Fourteenth Day of July, 1998

Attest:

BRUCE LEHMAN

*Attesting Officer*　　　*Commissioner of Patents and Trademarks*